United States Patent
Mayor et al.

[15] 3,637,372
[45] Jan. 25, 1972

[54] METHOD FOR RECOVERING NICKEL

[72] Inventors: Yoland P. P. Mayor, 1299 Commugny, Switzerland; Pierre F. Tord, 18, rue Visconti, Paris, France

[22] Filed: Nov. 6, 1969

[21] Appl. No.: 874,725

[30] Foreign Application Priority Data

Nov. 8, 1968 France....................................173235

[52] U.S. Cl..................................75/101, 75/109, 75/117, 75/119, 75/121
[51] Int. Cl..................................C22b 23/04, C22b 15/08
[58] Field of Search................75/119, 117, 109, 101, 114

[56] References Cited

UNITED STATES PATENTS

| | | | |
|---|---|---|---|
| 1,273,465 | 7/1918 | Dhavernas | 75/119 |
| 552,960 | 1/1896 | Hoepfner | 75/117 |
| 581,910 | 5/1897 | Goetz | 75/114 |
| 1,592,306 | 7/1926 | Lienhardt | 75/119 |
| 1,346,175 | 7/1920 | Caron | 75/119 |
| 1,825,949 | 10/1931 | Haas | 75/117 X |
| 2,400,461 | 5/1946 | Hills | 75/119 X |
| 1,011,562 | 12/1911 | Bradley | 75/114 X |

*Primary Examiner*—L. Dewayne Rutledge
*Assistant Examiner*—G. T. Ozaki
*Attorney*—Hammond & Littell

[57] ABSTRACT

The method provides the recovery of at least nickel from ores or other materials containing it possibly with copper, by treating the ores with a cupric chloride solution and an alkaline or alkaline earth chloride, and then separating the nickel from the said solution by cementing with iron.

3 Claims, No Drawings

METHOD FOR RECOVERING NICKEL

A process for recovering copper is known in which the copper is in the elemental state or reduced to such state, and which is characterized by the fact that the product from which it is desired to extract the copper is treated with a solution of cupric chloride and an alkali metal or alkaline earth metal chloride.

New investigations and research have shown that when the substances to be treated contain, among other things, nickel along, or nickel and/or copper, the nickel and copper, whichever of these metals are present, is separated out—under conditions similar to those occurring in the case of copper—after treatment with a solution of cupric chloride and an alkali metal or alkaline earth metal chloride (as was mentioned for copper in the process above referred to), and it is possible to reconstitute the initial treatment solution.

It appeared that these results can be explained by the fact that when a solution of cupric chloride is cemented with an elemental nickel, the reaction $$CuCl_2 + Ni = NiCl_2 + Cu \quad (1)$$

is actually the sum of two partial reactions:

$$2CuCl_2 \text{az} Ni = NiCl_2 + 2CuCl \quad (2)$$
$$2CuCl + Ni = NiCl_2 + 2Cu \quad (3)$$

The process according to the invention consists, therefore, in separating out the nickel—and possibly the copper accompanying it—which are present in the elemental state or are reduced to this state, from a substance or product which may contain it or them, by treating the said substance, under the conditions of the process mentioned hereinabove, with a solution of cupric chloride and an alkali metal or alkaline earth metal chloride which can be followed by cementation with iron.

In the case of nickel, the cupric chloride can be converted into insoluble copper hydroxychloride by using an oxidant such as air to act upon the nickel chloride, cupric chloride and alkali metal or alkaline earth metal solutions. After filter separation, centrifugation or any other known method, the copper hydroxychloride can be dissolved in hydrochloric acid and the cupric chloride thus obtained enables the initial treatment solution of the known process to be reconstituted.

Therefore, the separation treatment according to the invention is based on the following reactions:

$$2CuCl_2 \text{az} Ni = NiCl_2 + 2CuCl \quad (2)$$
$$2CuCl + H_2O + \tfrac{1}{2}O_2 = CuCl_2 \cdot Cu(OH)_2 \quad (4)$$
$$CuCl_2 \cdot Cu(OH)_2 + 2HCl = 2CuCl_2 + 2H_2O \quad (5)$$

the sum of which is $$Ni + \tfrac{1}{2}O_2 + 2HCl = NiCl_2 + H_2O \quad (6)$$

As in the case of copper alone, it is advantageous to use a slight excess of cupric chloride, which can be separated from the nickel chloride through precipitation in the form of an hydroxychloride by means of an alkaline reactant such as an alkaline earth metal carbonate. A solution of a nickel chloride and alkali metal or alkaline earth metal chloride is finally obtained, which is treated by any known means such as electrolysis, nickel hydroxide precipitation, iron or zinc cementing, etc.

This invention can be applied to substances (ores or other materials) in which nickel is present (possibly accompanied by copper) or is reduced to the elemental state; it is obviously very advantageous for the treatment of nickel ores, the most important of which, on an industrial level, are sulfurous ores and oxidized ores. Nickel is always accompanied by a large proportion of iron. In this case, the sulfurous ores are converted into oxidized ores by oxidizing roasting. To apply the process of the invention, the oxidized ores are reduced by a solid or gaseous reducing agent. The iron is converted into magnetite, and the nickel oxide into elemental nickel. The latter is extracted by means of the above-mentioned treatment solution, the magnetite can be recovered and purified by any suitable magnetic separation, and possibly by combining both these steps. Such magnetic separation can be carried out very advantageously by using the means described in French Pat. No 1,578,915 of May 6, 1968 for "Improvements to the magnetic separation of materials."

Hereinafter there will be given examples for the improvements, alterations and additions which are the object of the invention.

EXAMPLE 1

One hundred kg. of a lateritic ore containing 30 percent by weight iron in the form of limonite and 2.1 percent by weight of nickel in the form of an oxide were crushed to grains smaller than 1 mm., and treated at 700° C., in the fluid phase, with a gas containing (by volume) 5% CO, 5% $CO_2$ and 90% nitrogen, for 30 minutes. The ore was subsequently cooled in nitrogen and introduced into a magnetic separator with a tank according to the aforesaid French patent; 100 l. of a solution of 13.5 g. of crystallized cupric chloride $CuCl_2 \cdot 2H_2O$ in sodium chloride saturated water being circulated in the tank of the separator. Forty kg. of magnetite at 98.5% $Fe_3O_4$ was obtained plus 45 kg. of sterile products in the filter. The solution was oxidized with air and 0.6 kg. of calcium carbonate was added. After filtration, there was obtained 20 kg. of wet copper hydroxychloride which was suspended in 93 l. of saturated sodium chloride aqueous solution. The addition of 7 l. of hydrochloric acid at 37 percent caused dissolution of the hydroxychloride and regeneration of the initial decoppering or "treating" solution. The solution of nickel chlorides and sodium obtained after filtration of the copper hydroxychloride was cemented with 2.2 kg. of powdered iron, which provided 2.3 kg. of nickel cement containing 90% Ni.

EXAMPLE 2 one hundred kg. of oxidized ore obtained from roasting a concentrate of sulfurated ore and containing 4.6% Ni in the form of NiO, 6.1 percent copper in the form of CuO and 26% Fe in the form of $Fe_2O_3$, were crushed to grains smaller than 1 mm. in size and treated at 700° C. in a fluid phase by a gas containing (in volumes) 5% CO, 5% $CO_2$ and 90% $N_2$ for 30 minutes. This ore was then cooled in nitrogen and introduced into the magnetic separator mentioned in example 1, with 300 liters of a solution of 42.2 kg. of crystallized cupric chloride ($CuCl_2 \cdot 2H_2O$) in water saturated with sodium chloride circulating in the separator tank. Thirty-six kg. of magnetite at 98% $Fe_3O_4$ was thus obtained with 54 kg. of sterile products in the filter. The solution was oxidized by air and 1.8 kg. of calcium carbonate was added.

After filtration, 28.8 kg. of copper hydroxychloride (dry weight) was obtained; 11.2 kg. of which could be used as a fungicide, or for other purposes, was eliminated, the remainder was put in suspension in 287 liters of an aqueous sodium chloride solution. The addition of 13 liters of hydrochloric acid at 37 percent caused dissolution of the hydroxychloride and regeneration of the initial decoppering solution.

The solution of nickel and sodium chlorides obtained after filtration of the copper hydroxychloride was cemented with 4.8 kg. of iron powder, which provided 4.8 kg. of nickel cement at 90% Ni.

In this case, the copper from the ore was recovered in the form of hydroxychloride in the same process as the nickel in the form of cement.

What we claim is:

1. A process for the recovery of nickel from a material containing nickel and optionally copper comprising treating a material containing nickel and optionally copper with an aqueous solution of cupric chloride and a chloride selected from the group consisting of alkali metal chlorides and alkaline earth metal chlorides oxidizing the resulting solution and adding an alkaline reactant thereto to precipitate copper hydroxychloride, removing precipitated copper hydroxychloride from the resulting solution to form an aqueous solution of nickel chloride, and a chloride selected from the group consisting of alkali metal chlorides and alkaline earth metal chlorides and treating said solution with iron powder to recover by cementing with the iron.

2. A process according to claim 1 in which at least a part of the copper hydroxychloride separated is treated with hydrochloric acid, and recycling the copper chloride solution formed into the solution treating of the ores.

3. A process for recovering nickel and optionally copper from ores containing the same comprising reducing the said ores with a reducing agent, treating the reduced ore with a solution of cupric chloride in saturated aqueous sodium chloride solution to extract nickel and optionally copper therefrom, oxidizing the resulting solution and adding an alkaline reactant thereto to precipitate copper hydroxychloride, removing solids including copper hydroxychloride from the resulting solution, separating nickel from the resulting solution by cementation with iron, suspending the solids including copper hydroxychloride in a saturated aqueous sodium chloride solution, adding hydrochloric acid to the suspension to dissolve the copper hydroxy chloride as cupric chloride and recycling the dissolved cupric chloride solution to the extraction step.

\* \* \* \* \*